United States Patent
Buchaca et al.

(10) Patent No.: US 11,030,474 B1
(45) Date of Patent: Jun. 8, 2021

(54) PLANAR REGION BOUNDARIES BASED ON INTERSECTION

(71) Applicant: Apple Inc., Cupertino, CA (US)

(72) Inventors: Aitor Aldoma Buchaca, Los Gatos, CA (US); Michael Jaison Gnanasekar, Santa Clara, CA (US); Oliver M. Dunkley, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 16/423,658

(22) Filed: May 28, 2019

(51) Int. Cl.
| | |
|---|---|
| *G06K 9/00* | (2006.01) |
| *G06K 9/46* | (2006.01) |
| *G06T 19/00* | (2011.01) |
| *G06T 19/20* | (2011.01) |
| *G06T 7/13* | (2017.01) |

(52) U.S. Cl.
CPC ............. *G06K 9/4604* (2013.01); *G06T 7/13* (2017.01); *G06T 19/006* (2013.01); *G06T 19/20* (2013.01)

(58) Field of Classification Search
CPC ............ G06K 9/4604; G06K 9/00671; G06K 9/00201; G06K 9/00214; G06K 9/00624; G06K 2209/40; H04N 13/122; H04N 13/128; H04N 13/239; H04N 13/271; H04N 13/117; H04N 13/243; H04N 13/296; G06T 7/13; G06T 7/12; G06T 7/70; G06T 7/73; G06T 7/33; G06T 7/32; G06T 7/55; G06T 7/20; G06T 7/10; G06T 19/006; G06T 19/20; G06T 19/003; G06T 17/00; G06T 17/10; G06T 17/20; G06T 15/205; G06T 15/00; G06T 2207/10028; G06T 2207/10016; G06T 2207/10024; G06T 2219/2004; G06T 2219/2021; G06T 2210/12; G06T 2210/61; G02B 30/52; G02B 2027/014; G06F 3/011; G06F 3/04815; G06F 3/012; G06F 3/016; G06F 3/017; G06F 3/0481; G06F 3/04812
See application file for complete search history.

(56) References Cited

U.S. PATENT DOCUMENTS

| | | | |
|---|---|---|---|
| 9,514,574 B2 | 12/2016 | Reitmayr | |
| 9,996,974 B2 | 6/2018 | Reisner-Kollmann et al. | |
| 10,585,278 B2* | 3/2020 | Ng-Thow-Hing | .... G06F 3/0481 |
| 2014/0118397 A1* | 5/2014 | Lee | .......... G06T 7/521 |
| | | | 345/633 |
| 2015/0062117 A1* | 3/2015 | Reitmayr | ........... G06K 9/00624 |
| | | | 345/419 |
| 2015/0062120 A1* | 3/2015 | Reisner-Kollmann | ....................... G06T 19/006 |
| | | | 345/419 |
| 2018/0114264 A1* | 4/2018 | Rafii | .................. G06Q 30/0643 |

FOREIGN PATENT DOCUMENTS

WO    WO 2018175335    9/2018

* cited by examiner

*Primary Examiner* — Jose L Couso
(74) *Attorney, Agent, or Firm* — Thompson Hine LLP

(57) ABSTRACT

Implementations disclosed herein more accurately and efficiently identify planar region boundaries corresponding to surfaces in a physical environment based on identifying intersections. In some implementations a detected planar region is altered, e.g., trimmed or extended, based on detecting an intersection of the planar region with an expansion of another planar region. In other implementations, a detected planar region is altered, e.g., trimmed or extended, based on detecting an intersection of the planar region with a detected edge line.

21 Claims, 8 Drawing Sheets

US 11,030,474 B1

PLANAR REGION BOUNDARIES BASED ON INTERSECTION

TECHNICAL FIELD

The present disclosure generally relates to providing content on electronic devices, and in particular, to systems, methods, and devices for providing computer-generated reality (CGR) environments that utilize identified planar regions corresponding to surfaces of a physical environment.

BACKGROUND

Some computer-generated reality (CGR) systems capture an image or video stream of a physical environment and attempt to identify planar regions that correspond to surfaces of the physical environment. For example, such a system may attempt to identify a planar surface associated with a real world table top and then position virtual objects, e.g., a virtual vase, on that planar surface. The boundaries of planar surfaces identified using existing techniques often fail to correspond to the actual boundaries of the corresponding surfaces, e.g., the edge of the planar surface may go beyond the edge of the actual edge of the table. Improving planar region boundaries could enable improved CGR environments, for example, by avoiding virtual objects hanging off of table surfaces or floating in air based on being positioned using inaccurate planar region boundaries.

SUMMARY

Implementations disclosed herein more accurately and efficiently identify planar region boundaries corresponding to surfaces in a physical environment based on identifying intersections. In some implementations a detected planar region is altered, e.g., trimmed or extended, based on detecting an intersection of the planar region with another planar region or an intersection with an inflation/expansion of the other planar region. In other implementations, a detected planar region is altered, e.g., trimmed or extended, based on detecting an intersection of the planar region with a detected edge line or an inflation/expansion of a detected edge line.

In some implementations, an electronic device uses a processor to perform a method to alter a planar region associated with an object in a CGR environment. The method involves generating a representation of a first planar region such as a convex hull. The representation is associated with a first location in a three dimensional (3D) space based on detecting the physical environment. In some implementations, a convex hull is generated based on a set of points output by an image analysis, pose detection, or simultaneous localization and mapping (SLAM) technique. Landmarks on the planar surface may be identified and accumulated into an occupancy grid that is updated with each new frame's points during the provision of the CGR environment. In some implementations, the location of the planar region in 3D space is defined by an origin (e.g., a point on the planar region and a normal direction vector identifying a direction in the 3D space normal to the planar region).

The method also generates a representation of an element such as another convex hull or a line. The representation of the element is associated with a second location in the 3D space based on detecting the physical environment. In some implementations, the element is a second planar region. In such implementations, the method may identify candidate pairs of planar regions (e.g., first and second planar regions) based on spatial criteria (e.g., an angle between or distance apart) or other criteria such as whether the planar regions are vertical or horizontal. In some implementations, the element is an edge line, for example, an edge line detected using computer vision. In such implementations, the method may identify candidate plane-to-line pairs based on spatial criteria (angle between or distance apart)) or other appropriate criteria.

The method identifies an intersection based on the first planar region and the element. In some implementations, the element is altered (e.g., inflated or otherwise expanded) and the intersection is detected between the altered element and the first planar region. For example, the second planar region may be inflated/expanded and used to identify an intersection with the first planar region.

The method alters the first planar region based on the intersection. In some implementations, a portion of the first planar region is trimmed off and no longer included in the planar region. For example, if the first planar region extends a few inches beyond the actual edge of a table (identified by the intersection of the first planar region and the element), that first planar region may be altered to trim away the portion that extends beyond the detected intersection. In other implementations, the first planar region is expanded, for example, to include an additional planar portion between the original first planar region and the detected intersection.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
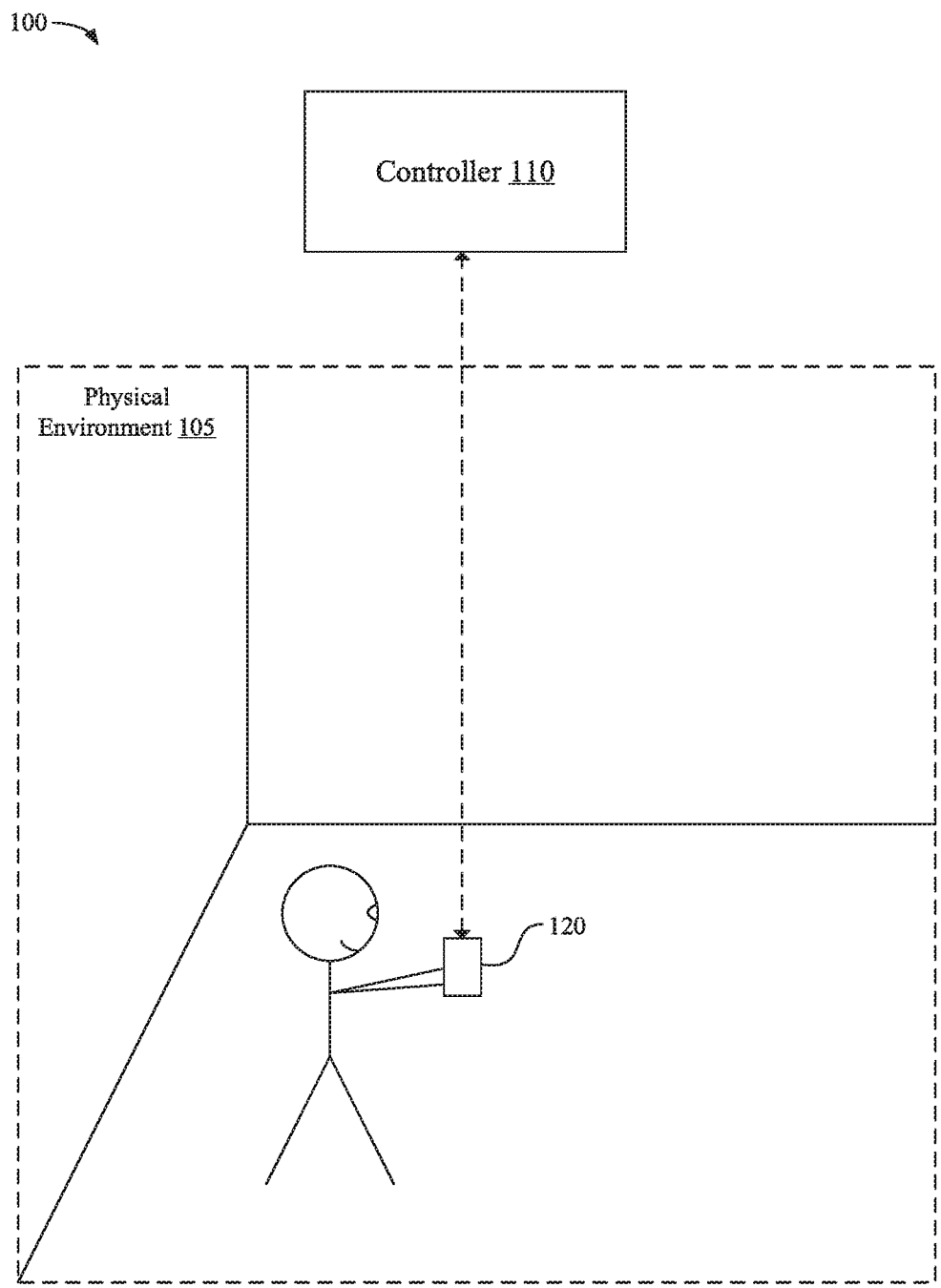
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
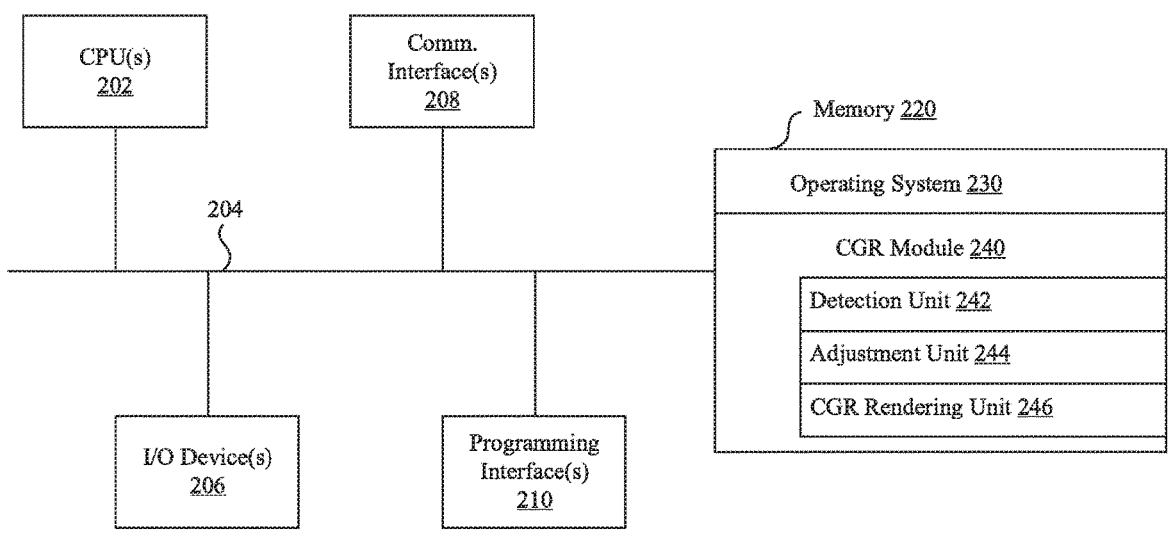
FIG. 2 is a block diagram of an example controller in accordance with some implementations.
Figure 3:
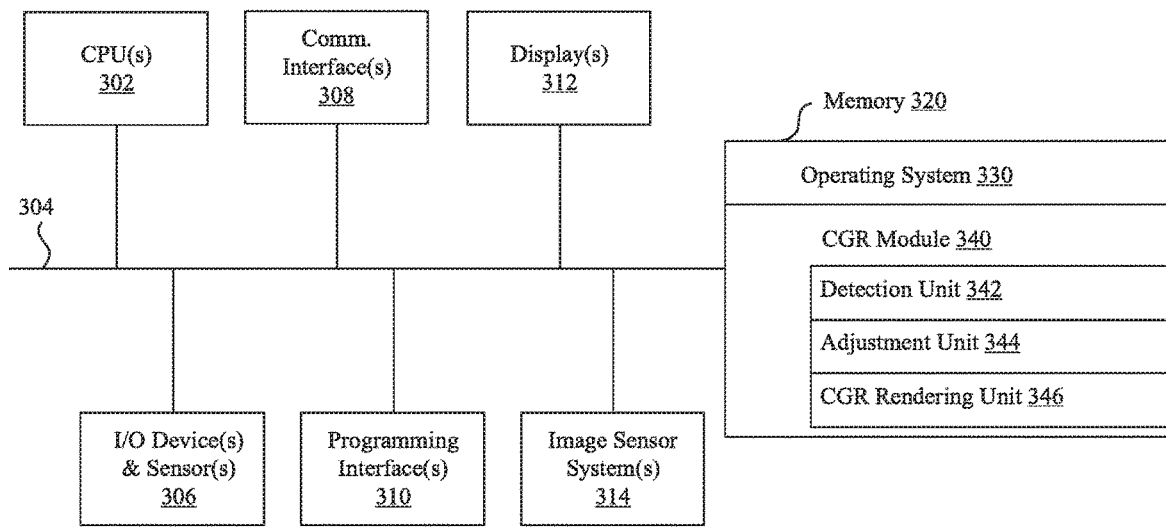
FIG. 3 is a block diagram of an example electronic device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a handheld electronic device, other implementations do not necessarily involve an handheld device and may involve other types of devices including, but not limited to, watches, head-mounted devices (HMDs), and other wearable electronic devices, laptops, desktops, gaming devices, home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the electronic device 120 is configured to present the CGR experience to the user. In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

According to some implementations, the electronic device 120 presents a computer-generated reality (CGR) experience to the user while the user is present within the physical environment 105. A computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the computer-generated reality (CGR) module 240 includes a detection unit 242, an adjustment unit 244, and a CGR rendering unit 246. The detection unit 242 detects planar regions, edges, and other geometric elements corresponding to elements of the physical environment. The detection unit may utilize computer vision, image analysis, pose detection, simultaneous localization and mapping (SLAM), or other techniques to identify the geometric elements.

The adjustment unit 244 determines an intersection and adjusts a planar region based on the intersection, e.g., trimming or extending the planar region. In some implementations, the adjustment unit 244 determines an intersection between a first planar region and a second geometric element (e.g., second planar region, edge, corner, etc.). In some implementations, the adjustment unit 244 extends a second geometric element and then determines an intersection between the first planar region and the extended second geometric element.

The CGR rendering unit 246 provides CGR environments, for example, by combining image content with virtual content to provide a view of an CGR environment for a user. The CGR environment may be provided as a series of frames that are viewed by the user over time. Each of such frames may include depictions of the physical environment based on a respective image captured of the physical environment. The CGR rendering unit 246 may render depictions of virtual objects in the CGR environment. The CGR rendering unit 246 may control the positioning or movement of virtual content based on adjusted planar region boundaries, e.g., ensuring that virtual objects are not positioned or moved based on an inaccurate planar region.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a computer-generated reality (CGR) module 340.

The operating system 330 includes procedures for handling various basic system services and for performing hardware dependent tasks.

In some implementations, the computer-generated reality (CGR) module 340 includes a detection unit 342, an adjustment unit 344, and a CGR rendering unit 346. The detection unit 342 detects planar regions, edges, and other geometric elements corresponding to elements of the physical environment. The detection unit 342 may utilize computer vision, image analysis, pose detection, simultaneous localization and mapping (SLAM), or other techniques to identify the geometric elements.

The adjustment unit 344 determines an intersection and adjusts a planar region based on the intersection, e.g., trimming or extending the planar region. In some implementations, the adjustment unit 344 determines an intersection between a first planar region and a second geometric element (e.g., second planar region, edge, corner, etc.). In some implementations, the adjustment unit 344 extends a second geometric element and then determines an intersection between the first planar region and the extended second geometric element.

The CGR rendering unit 346 provides CGR environments, for example, by combining image content with virtual content to provide a view of an CGR environment for a user. The CGR environment may be provided as a series of frames that are viewed by the user over time. Each of such frames may include depictions of the physical environment based on a respective image captured of the physical environment. The CGR rendering unit 346 may render depictions of virtual objects in the CGR environment. The CGR rendering unit 346 may control the positioning or movement of virtual content based on adjusted planar region boundaries, e.g., ensuring that virtual objects are not positioned or moved based on an inaccurate planar region.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
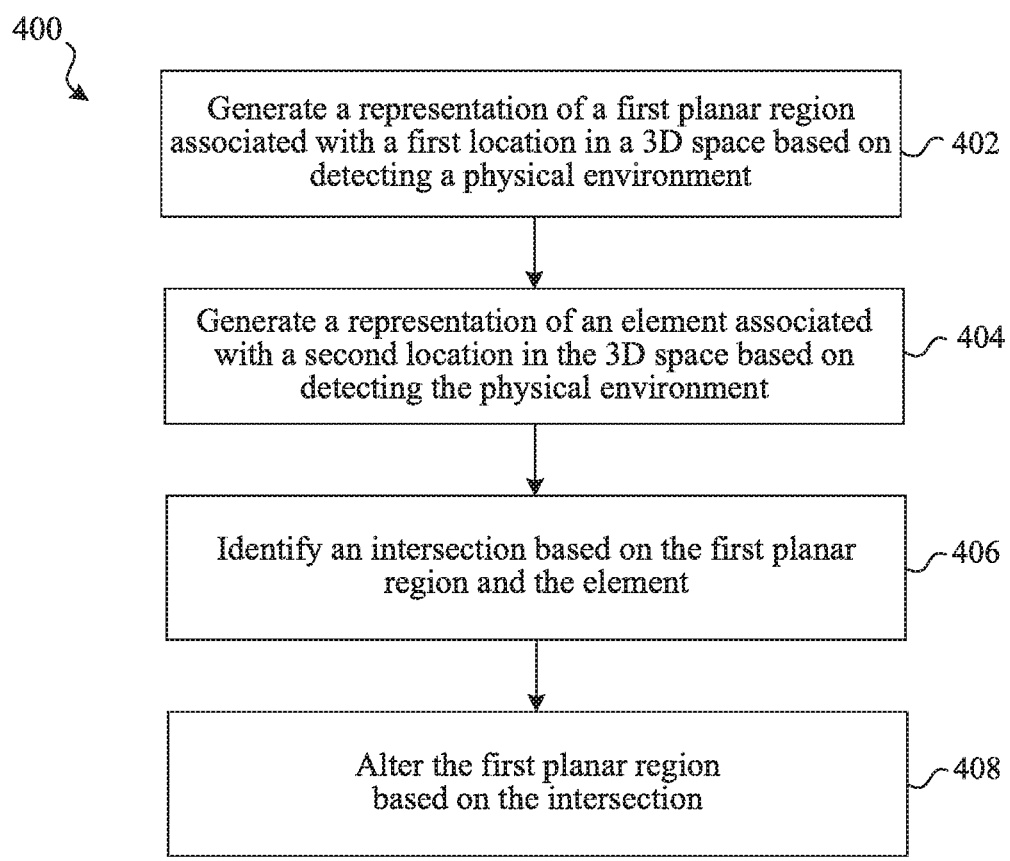
FIG. 4 is a flowchart illustrating an exemplary method for altering detected planar region boundaries in a CGR environment based on a detected intersection, according to some implementations.

FIG. 4 is a flowchart illustrating an exemplary method for altering detected planar region boundaries in a CGR environment based on a detected intersection. In some implementations, the method 400 is performed by a device (e.g., controller 100 or electronic device 120 of FIGS. 1-3). The method 400 can be performed at a mobile device, HMD, desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 involves generating a representation of a first planar region (e.g., a convex hull) associated with a first location in a three dimensional (3D) space based on detecting a physical environment. In some implementations, the representation of the first planar region is a convex hull generated based on a first set of points output by an image analysis, pose detection, or simultaneous localization and mapping (SLAM) technique. Landmarks on a planar surface may be identified and accumulated into an occupancy grid that is updated over time, e.g., with points associated with each new frame. In some implementations, the location of the first planar region in the 3D space is represented by a point on the planar surface in the 3D space and a normal direction vector of the planar region in the 3D space.

At block 404, the method 400 involves generating a representation of a element (e.g., a convex hull, line, point, etc.) associated with a second location in the 3D space based on detecting the physical environment. In some implementations, the element is a second planar region associated with a surface in the physical environment. For example, the second planar region may be a convex hull generated based on a second set of points output by an image analysis, pose detection, or SLAM technique. In some implementations, the method 400 identifies pairs of planar regions to be used to potentially alter one another, e.g., identifying the first planar region and the second planar region as a pair based on their respective locations, orientations, or other attributes. In some implementations, a candidate pair of planar regions is identified based on spatial criteria (e.g., angle between or distance apart) or based on identifying that the planar regions are vertical or horizontal (e.g., identifying 2 vertical planar regions that are angled relative to one another or identifying a horizontal and a vertical planar region).

In some implementations, the element is an edge line representing a detected edge of a surface in the physical environment. Such an edge, for example, by may be detected via computer vision or other image-based recognition technique. In some implementations, the method 400 identifies plane-to-line pair to potentially alter the first planar region, e.g., identifying the first planar region and an edge line as a pair based on their respective locations, orientations, or other attributes. The process may identify candidate plane-to-line pairs based on spatial criteria (angle between or distance apart). A line that is on the first planar region or within a threshold distance of being on the first planar region, for example, may be identified.

At block 406, the method 400 involves identifying an intersection based on the first planar region and the element. In some implementations, identifying the intersection comprises inflating the second planar region and identifying the intersection between an inflated region of the second planar region and the first planar region. Inflating a planar region may involve determining additional points on the same plane as the planar region in the 3D space. Various mathematical formulations and algorithms may be used to inflate a planar region in 3D space. Such techniques may utilize parameters that identify the direction(s) or magnitude(s) of the inflations of a planar region.

At block 408, the method 400 involves altering the first planar region based on the intersection. The method 400 may determine to trim or expand the first planar region based on the intersection. In some implementations, the method 400 determines to alter the first planar region by trimming a portion of the first planar region on one side of the intersection. In some implementations, the method 400 determines to alter the first planar region by expanding the first planar region to fill an area between the first planar region and the intersection.

The method 400 may identify a portion of the first planar region as a candidate for trimming and then determine whether to trim that candidate portion based on criteria. For example, the first planar region may determine to trim a first portion of the first planar region based on a ratio of the first portion of the first planar region on a first side of the intersection to a second portion of the first planar region on a second side of the intersection being within a threshold range (e.g., 2% to 10%). Such criteria can be used to ensure that the process does not undesirably cut a planar surface, e.g., cutting a planar region in half (after identifying a 50% ratio) may be undesirable as each side of the planar region may accurately correspond to different surfaces and the intersection bisecting those surfaces may be associated with a gap or other anomaly. Similarly, cutting only a relatively small portion (e.g., based on identifying a relatively small ratio) may be undesirable as small differences may be the result of non-uniform edges or other real characteristics of the surface boundary.

In some implementations, the method 400 is applied both ways for a candidate pair of planar regions, e.g., by expanding/inflating a second planar region, identifying a first intersection based on the expanded second planar region, and then altering the first planar region based on the first intersection and also expanding/inflating the first planar region, identifying a second intersection based on the expanded first planar region, and then altering the second planar region based on the second intersection.

In some implementations, the method 400 is selectively reapplied at subsequent points in time during the provision of the CGR environment, e.g., for subsequent frames. In some implementations, the method 400 is selectively reapplied for sub-sequent times based on whether the planar region or element change over time, e.g., between frames. Detecting such changes over time can be determined based on caching or otherwise storing the convex hulls or other representations of the planar regions and graphical elements and updating them over time as changes occur. Accordingly, in some implementations, the method 400 determines whether to alter the first planar region at a later time based on whether the first planar region or the element has changed.

Figure 5:
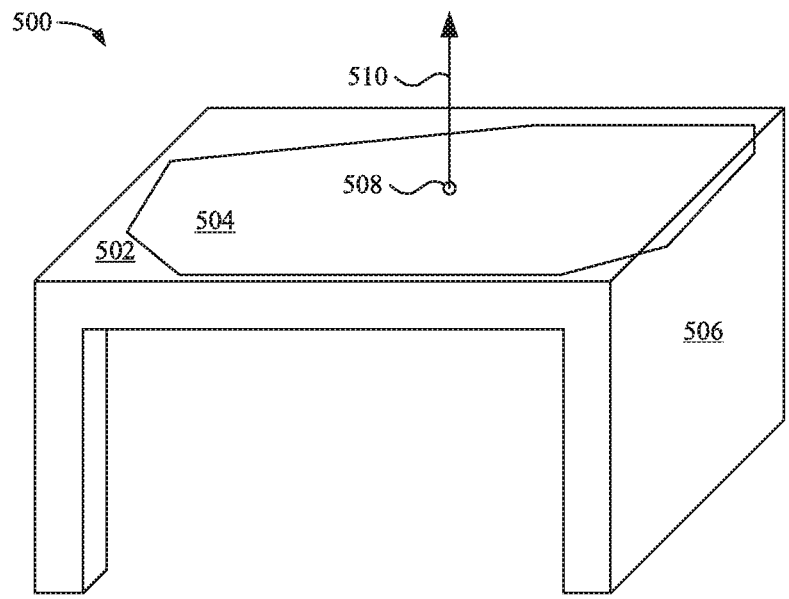
FIG. 5 is a block diagram illustrating a first planar region corresponding to a surface detected in a physical environment.

FIG. 5 is a block diagram illustrating a first planar region 504 corresponding to a first surface 502 detected in a physical environment 500. In this example, the physical environment 500 is captured in one or more images by a device, e.g., electronic device 120 of FIGS. 1 and 3. The physical environment 500 includes a table having a first surface 502 and a second surface 506. An initial planar region detection technique identifies the first planar region 504 corresponding to the first surface 502. In this example, the first planar region 504 is represented as a convex hull that may have been generated based on a first set of points output by an image analysis, pose detection, or SLAM technique. Landmarks on the first planar surface may have been identified and accumulated into an occupancy grid to produce the convex hull. The location of the first planar region 504 in the 3D space is also determined, e.g., based on the image analysis, pose detection, or SLAM technique, and represented by a point 508 in the 3D space and a normal direction vector 510 in the 3D space. As illustrated, boundaries of the first planar region 504 do not accurately correspond to boundaries of the first surface 502.

Figure 6:
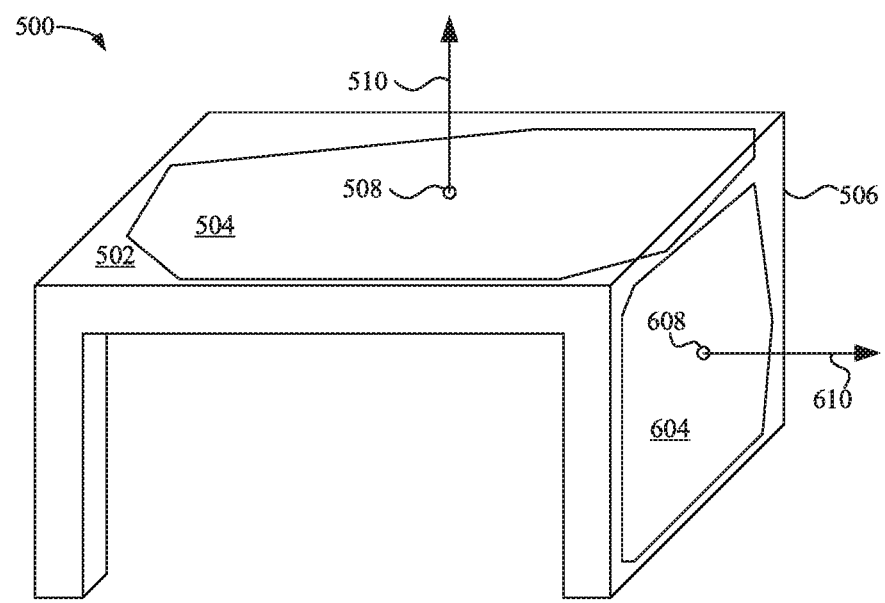
FIG. 6 is a block diagram illustrating the first planar region of FIG. 5 and a second planar region corresponding to a second surface detected in the physical environment.

FIG. 6 is a block diagram illustrating the first planar region 504 of FIG. 5 and a second planar region 604 corresponding to the second surface 506 detected in the physical environment. In this example, the physical environment 500 is captured in one or more images by a device, e.g., electronic device 120 of FIGS. 1 and 3. The same image or images or a different image or images may be used to identify the first and second planar regions 504, 604. In this example, an initial planar region detection technique identifies the second planar region 604 corresponding to the second surface 506. In this example, the second planar region 604 is represented as a convex hull that may have been generated based on a first set of points output by an image analysis, pose detection, or SLAM technique, e.g., the same (or different) technique used to identify the first planar region. The location of the second planar region 604 in the 3D space is also determined, e.g., based on the image analysis, pose detection, or SLAM technique, and represented by a point 608 in the 3D space and a normal direction vector 610 in the 3D space. As illustrated, boundaries of the second planar region 604 do not accurately correspond to boundaries of the second surface 506.

Figure 7:
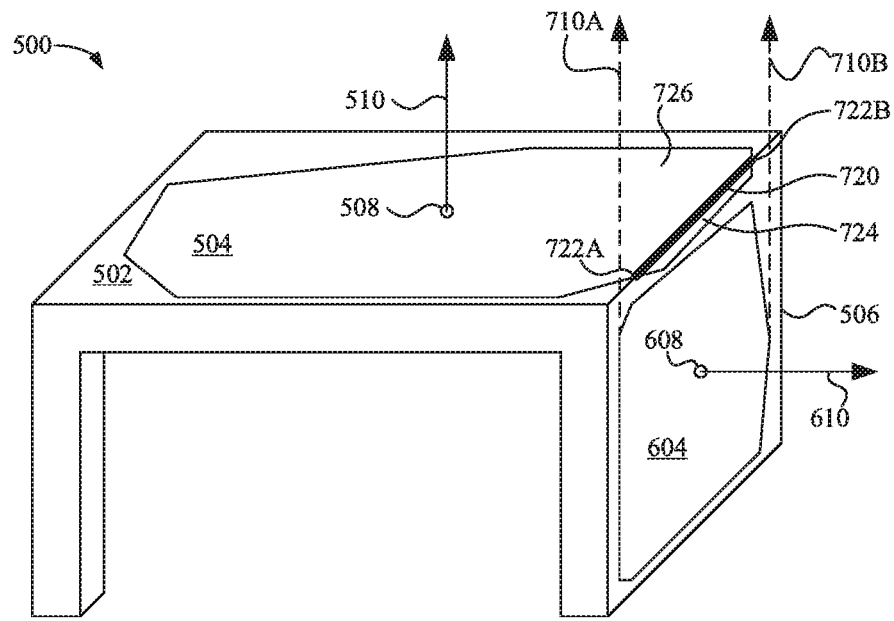
FIG. 7 is a block diagram illustrating an inflated surface second planar region intersecting the first planar region of FIGS. 5 and 6.

FIG. 7 is a block diagram illustrating an inflated second planar region 604 intersecting the first planar region 504 of FIGS. 5 and 6. In this example, the second planar region 604 is inflated at least in an upward direction, e.g., as indicated by arrows 710A-710B. In various implementations, a planar region is inflated by extending the planar region in one direction, two directions, three directions, or four directions (e.g., every direction) a specified amount or an infinite amount. In this example, the inflated second planar region 604 extends and intersects with the first planar region 504 along intersection 720, e.g., between points 722A and 722B. The intersection 720 divides the first planar region 504 into two portions, e.g., right portion 724 and left portion 726. In this example, the system determines to alter the first portion based on the ratio of sizes of the right portion 724 and left portion 726 satisfying a criteria, e.g., being within a particular range.

Figure 12:
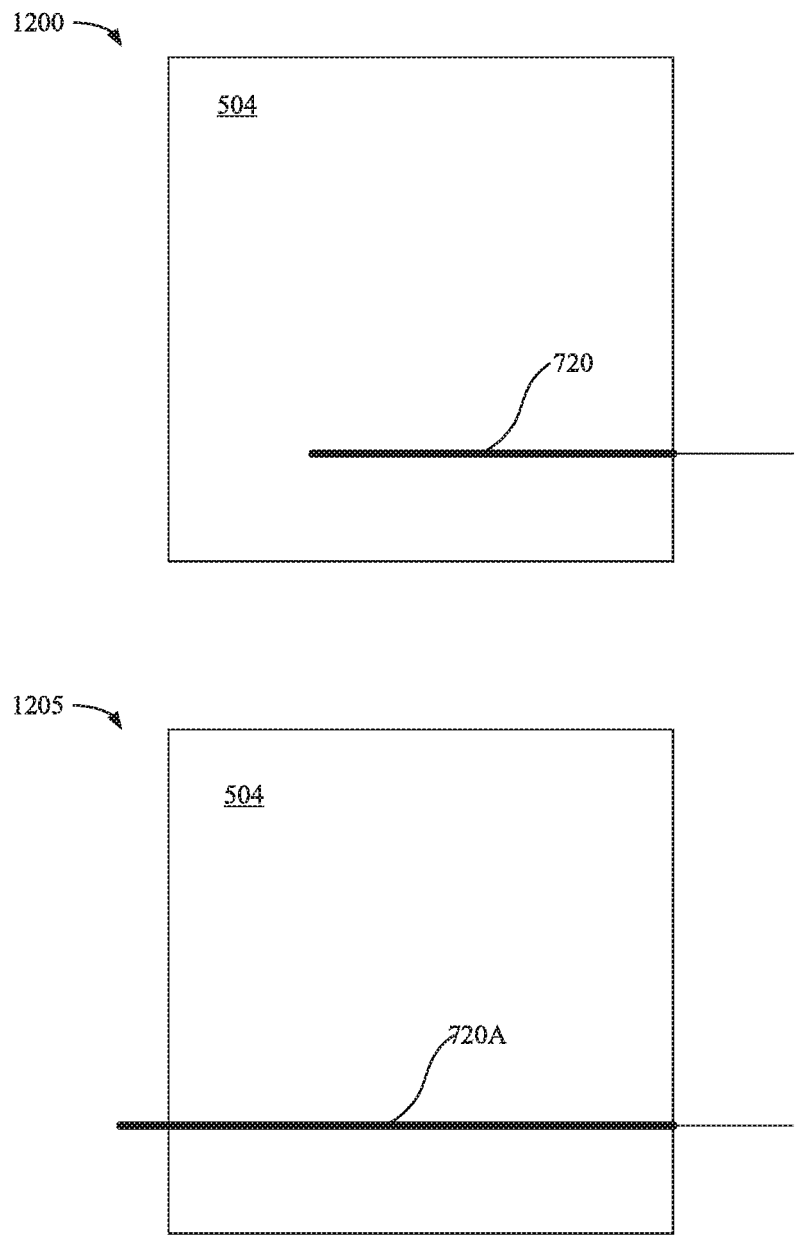
FIG. 12 is a block diagram illustrating a technique for extending an intersection.

In some instances an intersection may not fully divide a planar region into two portions. For example, example 1200 in FIG. 12 illustrates how planar region 504 is not fully divided into two portions by intersection 720. In some implementations, this circumstance is addressed by extending the intersection line in one or both directions. The intersection line may be extended by a predetermined amount or percentage. In example 1205 of FIG. 12, the intersection 720 has been extended to form extended intersection 720A. Since the extended intersection line 720A fully divides the planar region 504 into two portions the method may continue to determine whether to alter the planar region 504 based on other criteria.

Figure 8:
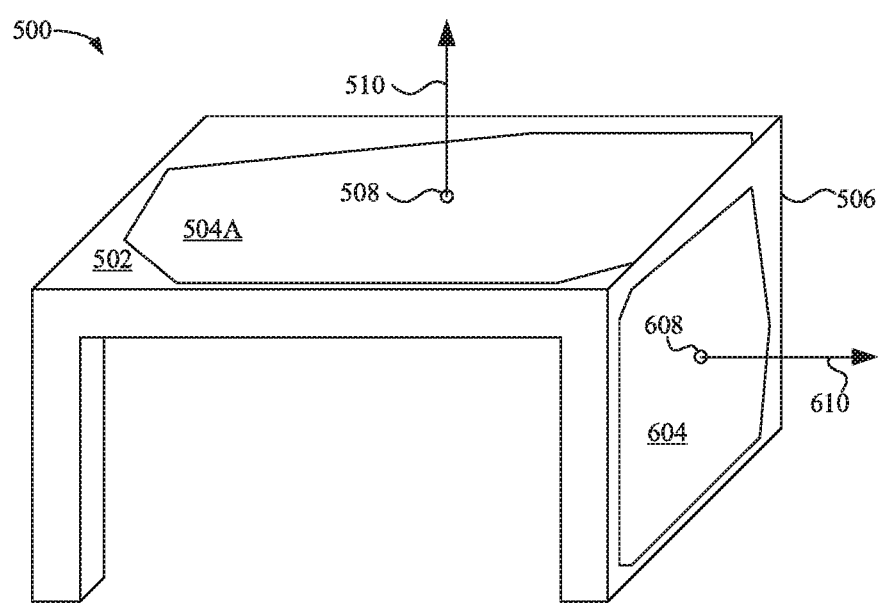
FIG. 8 is a block diagram illustrating altering the first planar region of FIGS. 5-7 based on the intersection of the first planar region with the inflated second planar region.

FIG. 8 is a block diagram illustrating altering the first planar region 504 of FIGS. 5-7 to form altered first planar region 504A based on the intersection 720 of the first planar region 504 with the inflated second planar region 604. Comparing FIGS. 7 and 8 illustrates that the right portion 724 of the first planar region 504 has been trimmed off of the first planar region 504 to provide the altered first planar region 504A.

Figure 9:
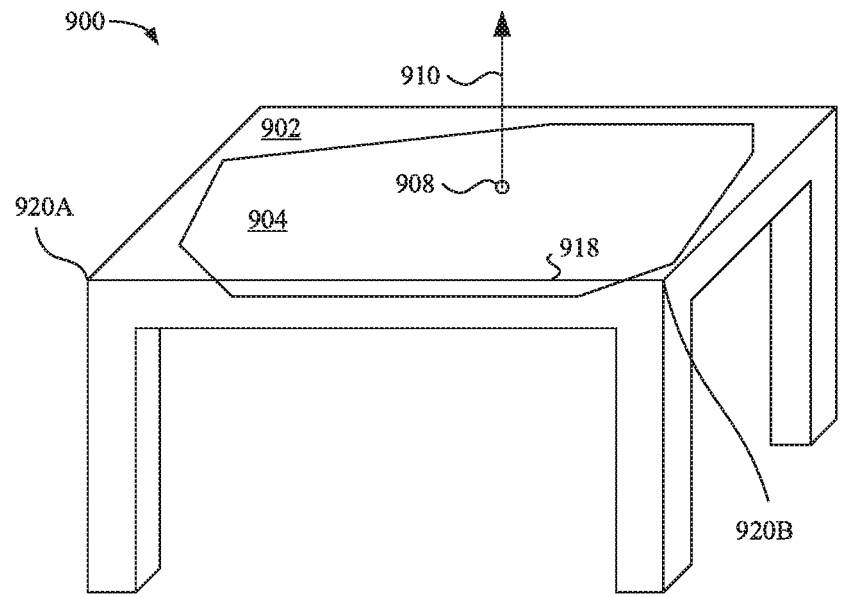
FIG. 9 is a block diagram illustrating a first planar region corresponding to a surface detected in a physical environment.

FIG. 9 is a block diagram illustrating a first planar region 904 corresponding to a surface 902 detected in a physical environment 900. In this example, the physical environment 900 is captured in one or more images by a device, e.g., electronic device 120 of FIGS. 1 and 3. The physical environment 900 includes a table having a first surface 902. An initial planar region detection technique identifies the first planar region 904 corresponding to the first surface 902. In this example, the first planar region 904 is represented as a convex hull that may have been generated based on a first set of points output by an image analysis, pose detection, or SLAM technique. Landmarks may have been identified and accumulated into an occupancy grid to produce the convex hull. The location of the first planar region 904 in the 3D space is also determined, e.g., based on the image analysis, pose detection, or SLAM technique, and represented by a point 908 in the 3D space and a normal direction vector 910 in the 3D space. As illustrated, boundaries of the first planar region 904 do not accurately correspond to boundaries of the first surface 902.

An element, e.g., a detected edge line 918 between points 920A and 920B, is also illustrated in FIG. 9. In this example, the edge line 918 is determined based on a computer vision technique, e.g., a neural network edge detection technique.

Figure 10:
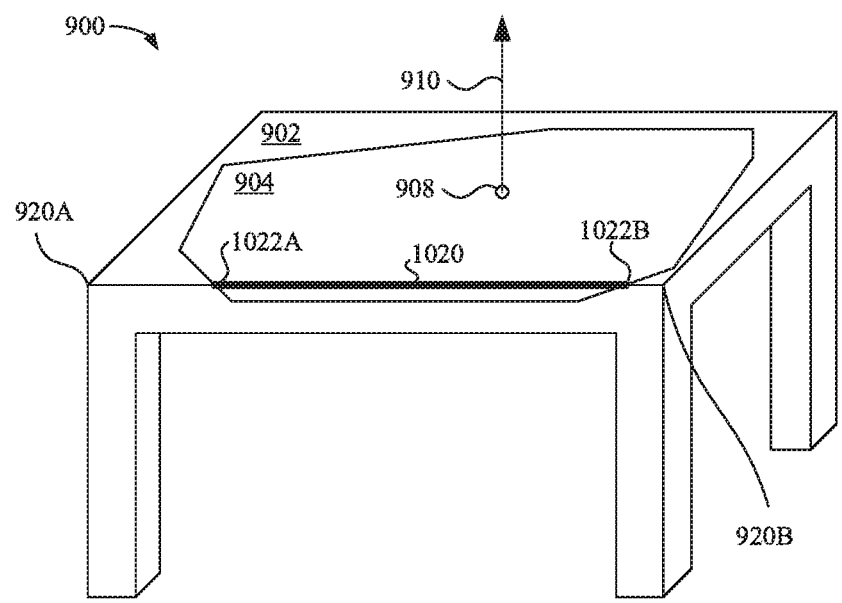
FIG. 10 is a block diagram illustrating a detected edge intersecting the first planar region of FIG. 9.

FIG. 10 is a block diagram illustrating the edge line 918 intersecting the first planar region 904 of FIG. 9. In this example, the edge line 918 extends along and intersects with the first planar region 904 along intersection 1020, e.g., between points 1022A and 1022B. The intersection 1020 divides the first planar region 504 into two portions. In this example, the system determines to alter the first portion based on the ratio of those portions satisfying a criteria, e.g., being within a particular range.

Figure 11:
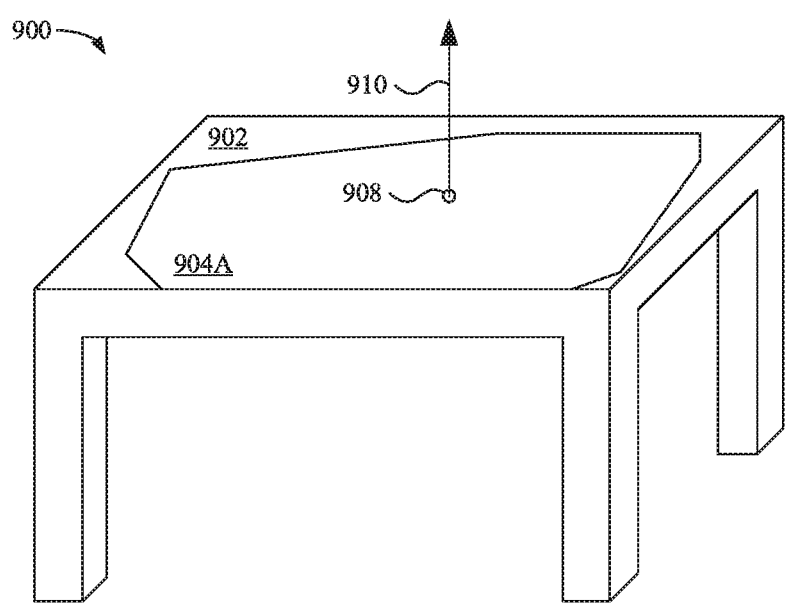
FIG. 11 is a block diagram illustrating altering the first planar region of FIGS. 9-10 based on the intersection of the first planar region with the detected edge.

FIG. 11 is a block diagram illustrating altering the first planar region 904 of FIGS. 9-10 to produce altered first planar region 904A based on the intersection 1020 of the first planar region 904 with the edge line 1020. Comparing FIGS. 10 and 11 illustrates that a front portion of the first planar region 904 has been trimmed off of the first planar region 904 to provide the altered first planar region 904A.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of altering a planar region associated with an object in a computer-generated reality (CGR) environment, the method comprising:
at a first electronic device having a processor:
generating a representation of a first planar region associated with a first location in a three dimensional (3D) space based on detecting a physical environment;
generating a representation of an element associated with a second location in the 3D space based on detecting the physical environment, wherein the element is a second planar region or an edge;
identifying an intersection based on the first planar region and the element; and
altering the first planar region based on the intersection.

2. The method of claim 1, wherein the representation of the first planar region is a convex hull generated based on a first set of points output by an image analysis, pose detection, or simultaneous localization and mapping (SLAM) technique.

3. The method of claim 1, wherein the location of the first planar region in the 3D space is represented by a point in the 3D space and a normal direction vector in the 3D space.

4. The method of claim 1, further comprising determining to trim a first portion of the first planar region based on a ratio of the first portion of the first planar region on a first side of the intersection to a second portion of the first planar region on a second side of the intersection.

5. The method of claim 1, wherein altering the first planar region comprises trimming a portion of the first planar region on one side of the intersection.

6. The method of claim 1, wherein altering the first planar region comprises expanding the first planar region to fill an area between the first planar region and the intersection.

7. The method of claim 1, further comprising determining whether to alter the first planar region at a later time based on whether the first planar region or the element has changed.

8. The method of claim 1, wherein the element is the second planar region, wherein the second planar region is a convex hull generated based on a second set of points output by an image analysis, pose detection, or simultaneous localization and mapping (SLAM) technique.

9. The method of claim 8, further comprising identifying a candidate pair of planar regions including the first and second planar regions based on the first and second planar regions satisfying spatial criteria.

10. The method of claim 8 further comprising identifying a candidate pair of planar regions including the first and second planar regions based on the first and second planar regions being determined to be approximately vertical or approximately horizontal based on a determined direction of gravity.

11. The method of claim 8, wherein identifying the intersection comprises inflating the second planar region and identifying the intersection between an inflated region of the second planar region and the first planar region.

12. The method of claim 8, further comprising:
inflating the first planar region;
identifying a second intersection between an inflated region of the first planar region and the second planar region; and
altering the second planar region based on the second intersection.

13. The method of claim 1, wherein the element is a line detected via a computer vision technique.

14. The method of claim 13 further comprising identifying a candidate pair of the first planar region and the line segment spatial criteria.

15. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
generating a representation of a first planar region associated with a first location in a three dimensional (3D) space based on detecting a physical environment;
generating a representation of an element associated with a second location in the 3D space based on detecting the physical environment, wherein the element is a second planar region or an edge;
identifying an intersection based on the first planar region and the element; and
altering the first planar region based on the intersection.

16. The system of claim 15, wherein the element is the second planar region, wherein the second planar region is a convex hull generated based on a second set of points output by an image analysis, pose detection, or simultaneous localization and mapping (SLAM) technique.

17. The system of claim 15, wherein identifying the intersection comprises inflating the second planar region and identifying the intersection between an inflated region of the second planar region and the first planar region.

18. A non-transitory computer-readable storage medium, storing program instructions computer-executable on a computer to perform operations comprising:
generating a representation of a first planar region associated with a first location in a three dimensional (3D) space based on detecting a physical environment;
generating a representation of an element associated with a second location in the 3D space based on detecting the physical environment, wherein the element is a second planar region or an edge;
identifying an intersection based on the first planar region and the element; and
altering the first planar region based on the intersection.

19. The non-transitory computer-readable storage medium of claim 18, wherein the element is the second planar region, wherein the second planar region is a convex hull generated based on a second set of points output by an image analysis, pose detection, or simultaneous localization and mapping (SLAM) technique.

20. The non-transitory computer-readable storage medium of claim 18, wherein identifying the intersection comprises inflating the second planar region and identifying the intersection between an inflated region of the second planar region and the first planar region.

21. The method of claim 1, wherein the first planar region and the element correspond to portions of an object.

* * * * *